United States Patent
Svensson

(12) 
(10) Patent No.: US 6,393,286 B1
(45) Date of Patent: May 21, 2002

(54) METHOD FOR IMPROVING HANDOVERS BETWEEN MOBILE COMMUNICATION SYSTEMS

(75) Inventor: Ola Richard Svensson, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/442,230

(22) Filed: Nov. 17, 1999

(51) Int. Cl.$^7$ .................................................. H04R 7/20
(52) U.S. Cl. ........................ 455/437; 455/67.1; 455/552
(58) Field of Search ............................... 455/67.1, 422, 455/423, 424, 425, 426, 436, 437, 552, 553, 575; 370/331, 332, 336, 337

(56) References Cited

U.S. PATENT DOCUMENTS

| | | | |
|---|---|---|---|
| 5,313,489 A | | 5/1994 | Menich et al. .................. 375/1 |
| 5,898,925 A | * | 4/1999 | Honkasalo et al. .......... 455/437 |
| 5,978,679 A | | 11/1999 | Agre ........................... 455/442 |
| 6,044,272 A | * | 3/2000 | Kobylinski et al. .......... 455/437 |
| 6,134,440 A | * | 10/2000 | Black .......................... 455/436 |
| 6,192,245 B1 | * | 2/2001 | Jones et al. ................. 455/437 |

OTHER PUBLICATIONS

Standard Search Report for RS 104325 completed on Jun. 20, 2000.

* cited by examiner

Primary Examiner—Nay Maung
Assistant Examiner—Quochien B. Vuong
(74) Attorney, Agent, or Firm—Jenkens & Gilchrist, P.C.

(57) ABSTRACT

A method for conveying measurement information from a mobile terminal in a first communication system to a second communication system is disclosed, whereby the measurement information related to the first communication system is conveyed to the second communication system on a control channel which can function in a non-stealing mode. For example, Universal Mobile Telecommunication System (UMTS) measurement information can be conveyed from a mobile terminal to a Base Station Controller (BSC) in a Global System for Mobile Communications (GSM) network, in a GSM message on a Slow Associated Control Channel (SACCH). In this way, the UMTS measurement information can be conveyed effectively between the two mobile communication systems without sacrificing the quality of speech information being conveyed. Moreover, handovers between the two mobile communication systems can be effectively performed.

16 Claims, 1 Drawing Sheet

METHOD FOR IMPROVING HANDOVERS BETWEEN MOBILE COMMUNICATION SYSTEMS

BACKGROUND OF THE INVENTION

1. Technical Field of the Invention

The present invention relates in general to the mobile communications field and, in particular, to a method for improving the performance of handovers between different mobile communication systems.

2. Description of Related Art

The Global System for Mobile Communications (GSM) has been a state-of-the-art digital Time Division Multiple Access (TDMA) mobile communications system for a number of years. A successor to the GSM and other existing digital systems is the so-called $3^{rd}$ generation mobile telephony system or Universal Mobile Telecommunication System (UMTS) currently under development. In order to offer global coverage for UMTS end users when this new system is first introduced, it will be possible to perform handovers between UMTS and GSM networks. In this way, the GSM networks will be able to provide coverage in those regions where UMTS network coverage is not provided. Consequently, when a mobile station (MS) sets up a call in a region where there is no coverage provided for UMTS users, the call will be set up on a GSM network. It will be possible to perform a handover back to a UMTS network when the MS moves into a region where the UMTS network provides coverage. In that way, an existing MS connection will still be maintained. This handover capability is quite important for speech connections, and even more important for on-line data connections.

A basic problem to be resolved with respect to the performance of handovers between GSM and UMTS networks is determining how to transport UMTS measurement information from an MS to the GSM Base Station Controller (BSC). Currently, the GSM (European Telecommunications Standards Institute or ETSI) Standard provides no spare signalling capacity on the up-link (UL) in the active mode. Consequently, the transport of UMTS measurement information from an MS to the GSM BSC will have to be performed at the expense of other information.

A proposed solution to the problem of determining how to transport UMTS measurement information from an MS to a GSM BSC for handovers is to send the measurement information from the UMTS portion of the MS on the GSM Fast Associated Control Channel (FACCH). However, a significant problem with using the FACCH to send UMTS measurement information from an MS to a GSM BSC during a handover is that the FACCH operates in a stealing mode, whereby a 20 ms segment of speech is exchanged for signalling information required for the handover. In other words, during GSM handovers, certain speech frames are used for signalling information instead of for speech information. Consequently, for GSM to UMTS handovers using measurements conveyed on a GSM FACCH, some of the speech frames would be used to convey the UMTS measurement information from the MS to the GSM BSC, which would severely reduce the quality of the speech information being conveyed. However, as described in detail below, the present invention successfully resolves this pressing handover problem and other related problems.

SUMMARY OF THE INVENTION

In accordance with a preferred embodiment of the present invention, a method for conveying measurement information from a mobile terminal in a first communication system to a second communication system is provided, whereby the measurement information related to the first communication system is conveyed to the second communication system on a control channel which can function in a non-stealing mode. For example, in accordance with the preferred embodiment, UMTS measurement information can be conveyed from an MS to a GSM BSC, in a GSM message on a Slow Associated Control Channel (SACCH).

An important technical advantage of the present invention is that measurement information can be conveyed effectively between different mobile communication systems without sacrificing the quality of speech information being conveyed.

Another important technical advantage of the present invention is that handovers between different types of mobile communication systems can be effectively performed.

Still another important technical advantage of the present invention is that coverage for a UMTS network can be expanded using GSM network coverage.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
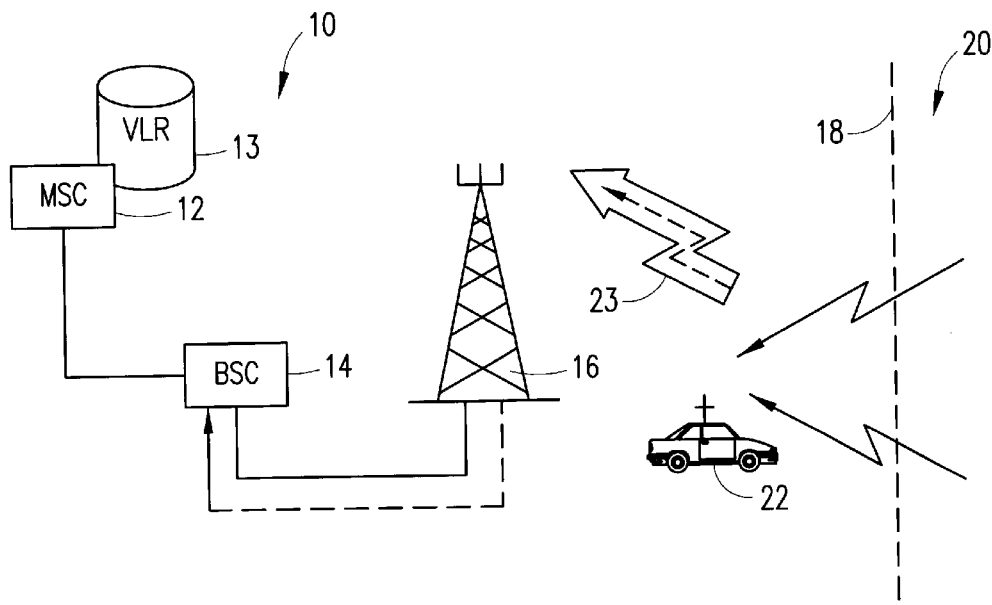
FIG. 1 is a simplified block diagram that can be used to illustrate a preferred embodiment of the present invention.
Figure 2:
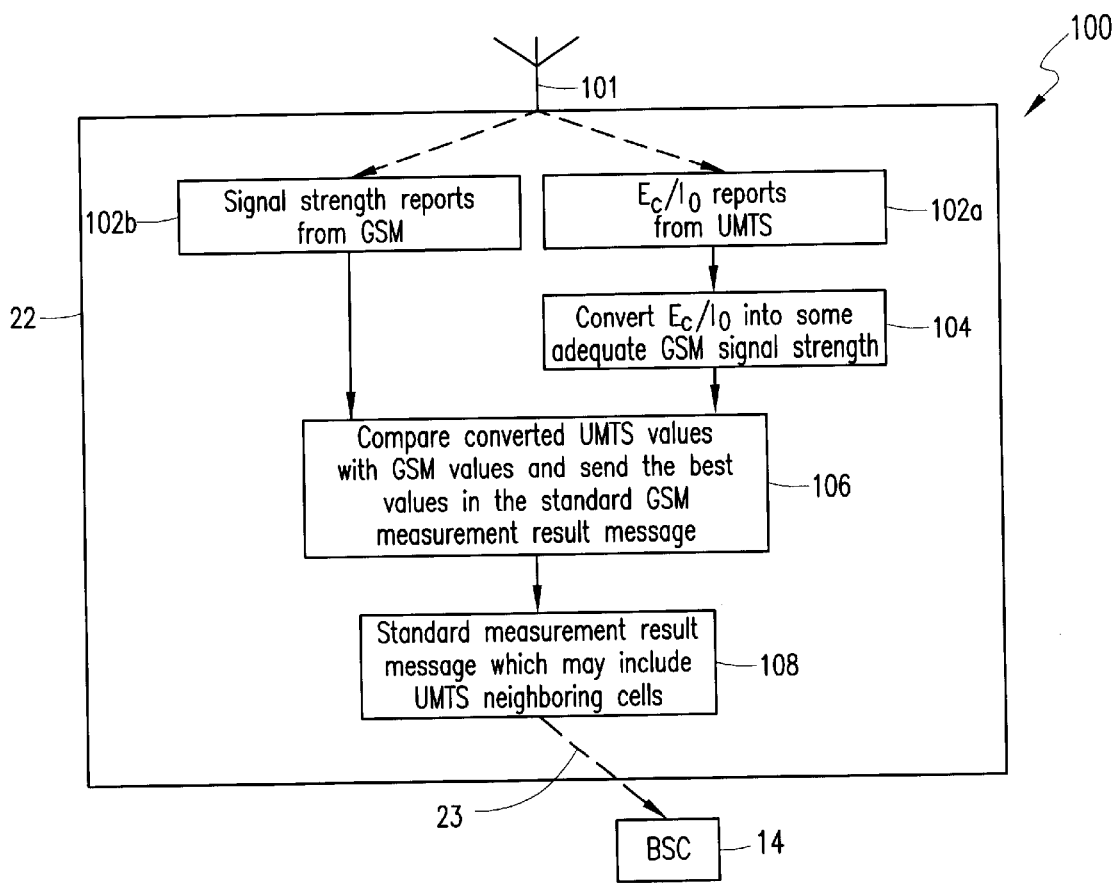
FIG. 2 is a flow diagram of an exemplary method that can be used to implement the preferred embodiment of the present invention.

The preferred embodiment of the present invention and its advantages are best understood by referring to FIGS. 1–2 of the drawings, like numerals being used for like and corresponding parts of the various drawings.

Essentially, in accordance with a preferred embodiment of the present invention, a method for conveying measurement information from a mobile terminal in a first communication system to a second communication system is provided, whereby the measurement information related to the first communication system is conveyed to the second communication system on a control channel which can function in a nonstealing mode. For example, in accordance with the preferred embodiment, UMTS measurement information can be conveyed from an MS to a GSM BSC, in a GSM message on a Slow Associated Control Channel (SACCH). In this way, the UMTS measurement information can be conveyed effectively between the two mobile communication systems without sacrificing the quality of speech information being conveyed. Moreover, handovers between the two mobile communication systems can be effectively performed.

Specifically, FIG. 1 is a simplified block diagram that can be used to illustrate a preferred embodiment of the present invention. For this exemplary embodiment, assume that a GSM network 10 includes a Mobile Services Switching Center (MSC) 12 coupled to a Visitor Location Register (VLR) 13. The MSC and VLR in network 10 can be co-located or separate entities. The MSC 12 is connected to a BSC 14, which can evaluate incoming measurement information and make handover decisions. The BSC 14 is also connected to a Radio Base Station (RBS), which includes a Base Transceiver Station (BTS) 16. The BTS 16 can measure signal strength and transmission quality on the UL Traffic Channel (TCH). More importantly, the BTS 16 can receive measurement reports from each one of a plurality of mobile terminals. The BTS 16 (via the RBS) conveys the measurement report information to the BSC 14.

For this embodiment, also assume that a cell in a UMTS network 20 has been defined by a node B (not explicitly shown) to include a portion of the region in FIG. 1 which is located to the right of the vertical dotted line 18. A GSM network cell defined by BTS 16 includes a portion of the region in FIG. 1 which is located to the left of the vertical dotted line 18. A mobile terminal (MS 22) operating in a GSM cell (10) is capable of making UMT9 measurements related to the UMTS cell (20) and conveying them (in measurement reports) to the GSM BSC in the measurement reports on the SACCH for handover decisions. Notably, the UMTS measurement information being reported is different from the typical GSM mesurement information being reported.

For example, a typical GSM MS continuously measures and reports (on the UL) signal strength (dBm) and quality (Bit Error Rate or BER) of its own cell, and signal strength of the Broadcast Control Channel (BCCH) carriers of the neighboring cells. On the other hand, instead of measuring signal strength in a UMTS cell, a UMTS MS measures and reports (on the UL) the Code Energy-to-Interference Ratio ($E_c/I_0$) or Received Signal Code Power (RSCP in dBm) of the UMTS cell. Consequently, in order for an MS (e.g., 22) to convey UMTS measurement information to a GSM BSC (e.g., for handover purposes), the UMTS measurement information is preferably converted to an appropriate GSM measurement format. As such, in accordance with the preferred embodiment of the present invention, an exemplary method that can be used by an MS for converting UMTS measurement information to a GSM measurement information format is described below with respect to FIG. 2.

Referring to FIG. 2, a microprocessor (not explicitly shown) located in an MS (e.g., 22) can be used to implement the exemplary conversion method 100 shown, in accordance with the preferred embodiment of the present invention. For example, at step 102$_a$ of the method, the MS 22 retrieves from local memory, $E_c/I_0$ or RSCP information (from the signal received on antenna 101) measured and stored for reporting to a GSM BSC (14). At step 102$_b$, the MS 22 (e.g., a dual-mode MS) can also retrieve from local memory, signal strength information (dBm) measured and stored for reporting to a GSM BSC. At step 104, the MS 22 converts the retrieved UMTS $E_c/I_0$ or RSCP measurement information to appropriate GSM signal strength information, which can be used by the GSM BSC 14 for making handover decisions. For example, the UMTS RSCP measurement information retrieved by the MS 22 can be converted to appropriate GSM signal strength measurement information (RXLEV) by using the following equation:

$$\text{RXLEV} = \text{RSCP} + \text{OFFSET}(\text{RSCP}), \qquad (1)$$

where RXLEV represents GSM signal strength measurements [e.g., −110,−47] in dBm, RSCP represents UMTS signal strength measurements in dBm, and OFFSET represents offset values that can be constant or variable with RSCP.

At step 106, the MS 22 compares the converted UMTS signal strength values (derived from step 104) with the set of stored GSM signal strength values (derived from step 102$b$). The MS 22 then retrieves a predetermined number (e.g., 6, or the maximum number of neighboring cells included in a GSM measurement report) of the "best" measurement values from step 106 to be reported in a measurement report to the GSM BSC 14. At step 108, for this exemplary embodiment, the MS 22 sends a GSM-type measurement report for receipt at the is BSC 14 (via BTS 16) on the GSM SACCH over the radio air interface 23. The GSM-type measurement report can include signal strength information about UMTS neighboring cells. Alternatively, at step 106, instead of comparing the converted UMT9 measurement values with GSM measurement values, the MS can convert each stored UMTS measurement value to an appropriate GSM signal strength value, and select each converted UMTS measurement value that exceeds a predetermined signal strength threshold value, for reporting to the GSM BSC 14.

Using the above-described method (100) in accordance with the preferred embodiment of the present invention, the UMTS measurement information from the MS 22 can be converted to a GSM measurement format and sent to the OSM BSC 14 on the SACCH for use in making handover decisions. Consequently, since the SACCH does not operate in a stealing mode, the quality of the speech and on-line data being conveyed between the MS 22 and the GSM network 10 will not be diminished due to the use of speech frames for measurement signalling.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for conveying measurement information from a terminal in a first communication system to a second communication system, comprising the steps of:

converting a plurality of downlink measurement values associated with said first communication system to a plurality of downlink measurement values for said second communication system;

comparing said converted plurality of downlink measurement values with at least one threshold measurement value; and if at least one of said converted plurality of downlink measurement values exceeds a predetermined threshold measurement value, sending said at least one of said converted plurality of downlink measurement values on a control channel to a control node in said second communication system.

2. The method of claim 1, wherein said first communication system comprises a UMTS.

3. The method of claim 1, wherein said second communication system comprises a GSM.

4. The method of claim 1, wherein said plurality of downlink measurement values associated with said first communication system comprises a plurality of $E_c/I_0$ values.

5. The method of claim 1, wherein said plurality of downlink measurement values associated with said first communication system comprises a plurality of RSCP values.

6. The method of claim 1, wherein said plurality of downlink measurement values associated with said second communication system comprises a plurality of signal strength values.

7. The method of claim 1, wherein said control channel comprises a control channel operable in a non-stealing mode.

8. The method of claim 1, wherein said control channel comprises a SACCH.

9. A mobile terminal for use in conveying measurement information from a first communication system to a second communication system, comprising:

means for converting a plurality of downlink measurement values associated with said first communication system to a plurality of downlink measurement values for said second communication system;

means for comparing said converted plurality of downlink measurement values with at least one threshold measurement value; and means for sending said at least one of said converted plurality of downlink measurement values on a control channel to a control node in said second communication system if at least one of said converted plurality of downlink measurement values exceeds a predetermined threshold measurement value.

10. The mobile terminal of claim 9, wherein said first communication system comprises a UMTS.

11. The mobile terminal of claim 9, wherein said second communication system comprises a GSM.

12. The mobile terminal of claim 9, wherein said plurality of downlink measurement values associated with said first communication system comprises a plurality of $E_c/I_0$ values.

13. The mobile terminal of claim 9, wherein said plurality of downlink measurement values associated with said first communication system comprises a plurality of RSCP values.

14. The mobile terminal of claim 9, wherein said plurality of downlink measurement values associated with said second communication system comprises a plurality of signal strength values.

15. The mobile terminal of claim 9, wherein said control channel comprises a control channel operable in a non-stealing mode.

16. The mobile terminal of claim 9, wherein said control channel comprises a SACCH.

* * * * *